United States Patent [19]
Smith et al.

[11] Patent Number: 5,431,477
[45] Date of Patent: Jul. 11, 1995

[54] WIND DEFLECTOR FOR VEHICLE SUNROOF

[75] Inventors: Norman P. Smith, Southam; Christopher Bilsborrow, Nr Nuneaton, both of England

[73] Assignee: Jaguar Cars Limited, England

[21] Appl. No.: 114,739

[22] Filed: Aug. 31, 1993

[30] Foreign Application Priority Data

Sep. 2, 1992 [GB] United Kingdom ............... 9218824

[51] Int. Cl.⁶ .................................................. B60J 7/22
[52] U.S. Cl. .................................. 296/217; 454/129; 454/906; 296/152
[58] Field of Search ............ 296/217, 152, 96.11; 454/128, 129, 131, 133, 135, 906

[56] References Cited

U.S. PATENT DOCUMENTS

| | | | |
|---|---|---|---|
| 2,878,055 | 3/1959 | Werner et al. | 296/152 |
| 3,311,406 | 3/1967 | Fritsch | 296/217 |
| 4,662,671 | 5/1987 | Davis | 296/217 |
| 4,971,387 | 11/1990 | Bohm et al. | 296/217 |

FOREIGN PATENT DOCUMENTS

| | | | |
|---|---|---|---|
| 0490213 | 6/1992 | European Pat. Off. | 296/217 |
| 1051657 | 2/1959 | Germany | 296/217 |
| 2357906 | 5/1975 | Germany | 296/217 |
| 3925808 | 2/1991 | Germany | 296/217 |
| 4012569 | 5/1991 | Germany | 296/217 |
| 0057014 | 4/1984 | Japan | 296/217 |

*Primary Examiner*—Dennis H. Pedder
*Attorney, Agent, or Firm*—Davis, Bujold & Streck

[57] ABSTRACT

A wind deflector for the sunroof of a vehicle has an elongate body located transversely of the vehicle along the leading edge of the sunroof aperture and extending above the level of the vehicle roof, the elongate body having alternating sections of different height, vane formations being provided between the upper edges of the taller sections to bridge the lower sections and to deflect air passing between the taller sections down through the sunroof aperture.

15 Claims, 9 Drawing Sheets

WIND DEFLECTOR FOR VEHICLE SUNROOF

BACKGROUND TO THE INVENTION

The present invention relates to wind deflectors for vehicle sunroofs.

The sunroofs of vehicles, when open, produce significant noise levels which increase with the speed of the vehicle. Generally the noise is of a broadband nature due to pressure fluctuations resulting from the shear layer between the exterior air flow and the stationary air in the vehicle. In addition to this broadband noise, resonant interactions between the shear layer and the air inside the vehicle create low frequency pressure fluctuations which produce a booming noise over a critical speed range which is typically 30 to 70 miles per hour.

Conventionally, wind deflectors of uniform profile have been fitted to the leading edge of the sunroof aperture, so that they extend above the line of the roof when the sunroof is open, thereby deflecting the air flow away from the sunroof aperture. Wind deflectors of this form significantly reduce the broadband noise and also reduce buffeting of air within the vehicle. However they are not effective in reducing the 'boom'. As a result, even with a wind deflector of this form, it is necessary to reduce the degree of opening of the sunroof in order to reduce the 'boom' to acceptable levels, when travelling at speeds at which intense boom would otherwise occur.

It has been found, as disclosed for example in German patent specification numbers DE 3925808 and DE 4012569, that modifying the profile of the wind deflector, so that its upper edge is castellated, does provide some reduction in 'boom' but the 'boom' is still obtrusive at speeds within the critical range.

The present invention provides a wind deflector with modified profile which will significantly reduce 'boom' at speeds within the critical range, with the sunroof fully open.

SUMMARY OF THE INVENTION

According to one aspect of the present invention a wind deflector for the sunroof of a vehicle comprises an elongate body adapted to be located transversely of the vehicle along the leading edge of the sunroof aperture, the body extending above the level of the vehicle roof, the elongate body having alternate sections of different height, vane formations extending between the upper edges of the taller sections to bridge the lower sections, the vane formations being adapted to deflect air passing between the vane formations and the lower sections down through the sunroof aperture.

The vane formations interconnecting adjacent taller sections may conveniently be continued across the taller sections to form a continuous vane formation running the full length of the elongate body. Preferably, the leading edge of the vane formation is substantially parallel, that is inclined at an angle between ±5 degrees, to the roof line; while the trailing edge is inclined downwardly at an angle from 10 to 30 degrees to the roof line. The vane formation is preferably 10 to 30 mm wide. The faces defining the upper edge of the lower sections of the elongate body are preferably inclined at a similar angle to the trailing edge of the vane formation.

The alternating taller and lower sections of the elongate body are preferably substantially equally spaced and of similar width. Typically the width of the taller and lower sections may be from 25 mm to 75 mm. The upper edge of the lower sections is preferably located at or below the level of the roof, while the taller sections extend beyond the roof level so that the vane formations are disposed above the roof level. Preferably when the wind deflector is in its operative position the vane formation is disposed at at least 15 mm above the roof level. The height of the vane formation is restricted by the need to accommodate the wind deflector in a limited space beneath the roof when the sunroof is closed, but typically the vane formation will be disposed at a height of between 15 mm and 30 mm above the roof level, when the wind deflector is in its operative position.

In conventional manner, the elongate body is preferably located along the leading edge of the sunroof aperture on pivoting arms, the arms being biased upwardly so that the wind deflector will automatically be deployed when the sunroof is opened. The wind deflector being retracted below the roof, when the sunroof is closed.

BRIEF DESCRIPTION OF THE DRAWINGS

The invention is now described by way of example only, with reference to the accompanying drawings in which.

DESCRIPTION OF A PREFERRED EMBODIMENT

Figure 1:
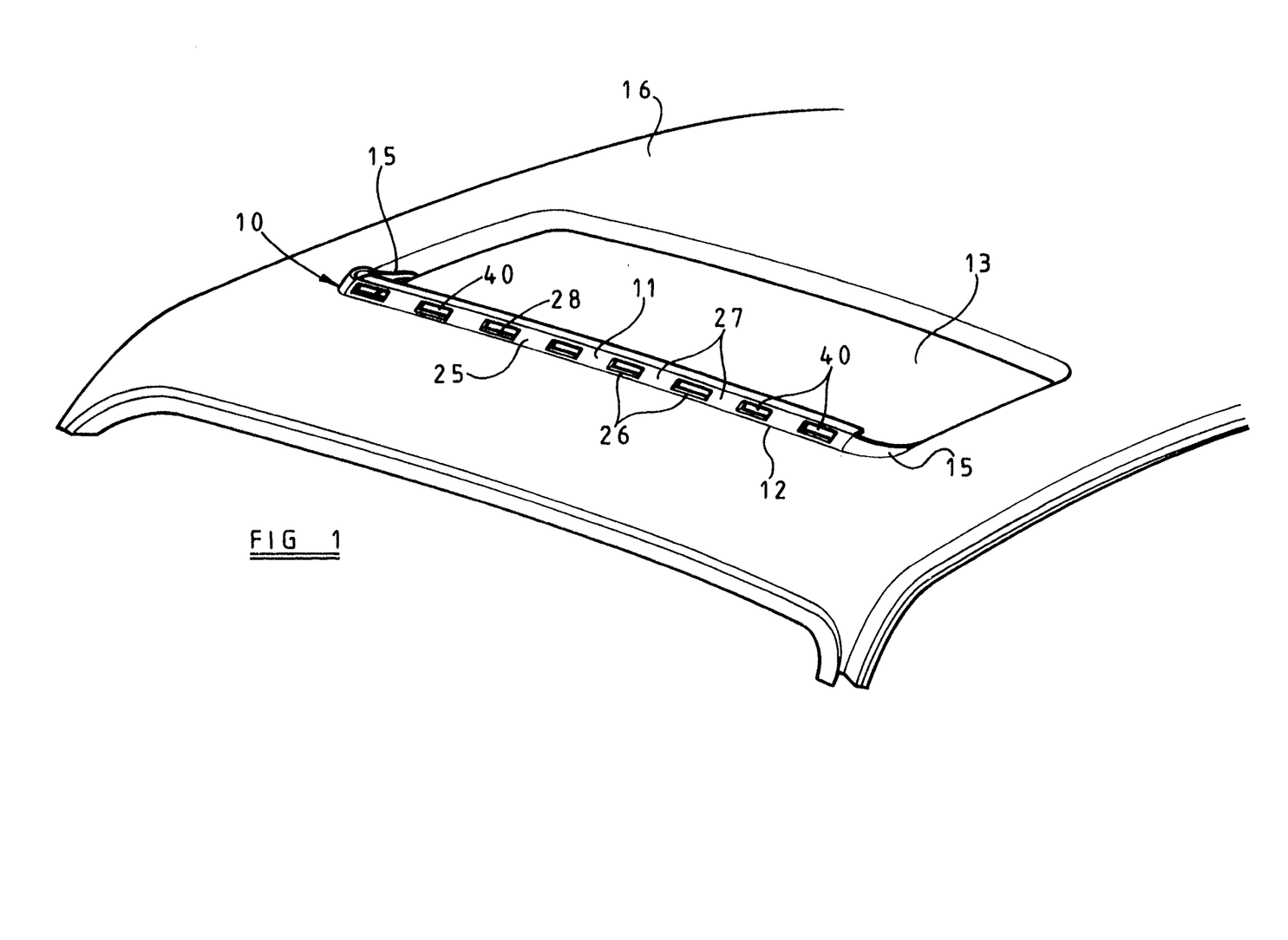
FIG. 1 is a perspective view of a vehicle roof with a sunroof wind deflector in accordance with the present invention.
Figure 2:
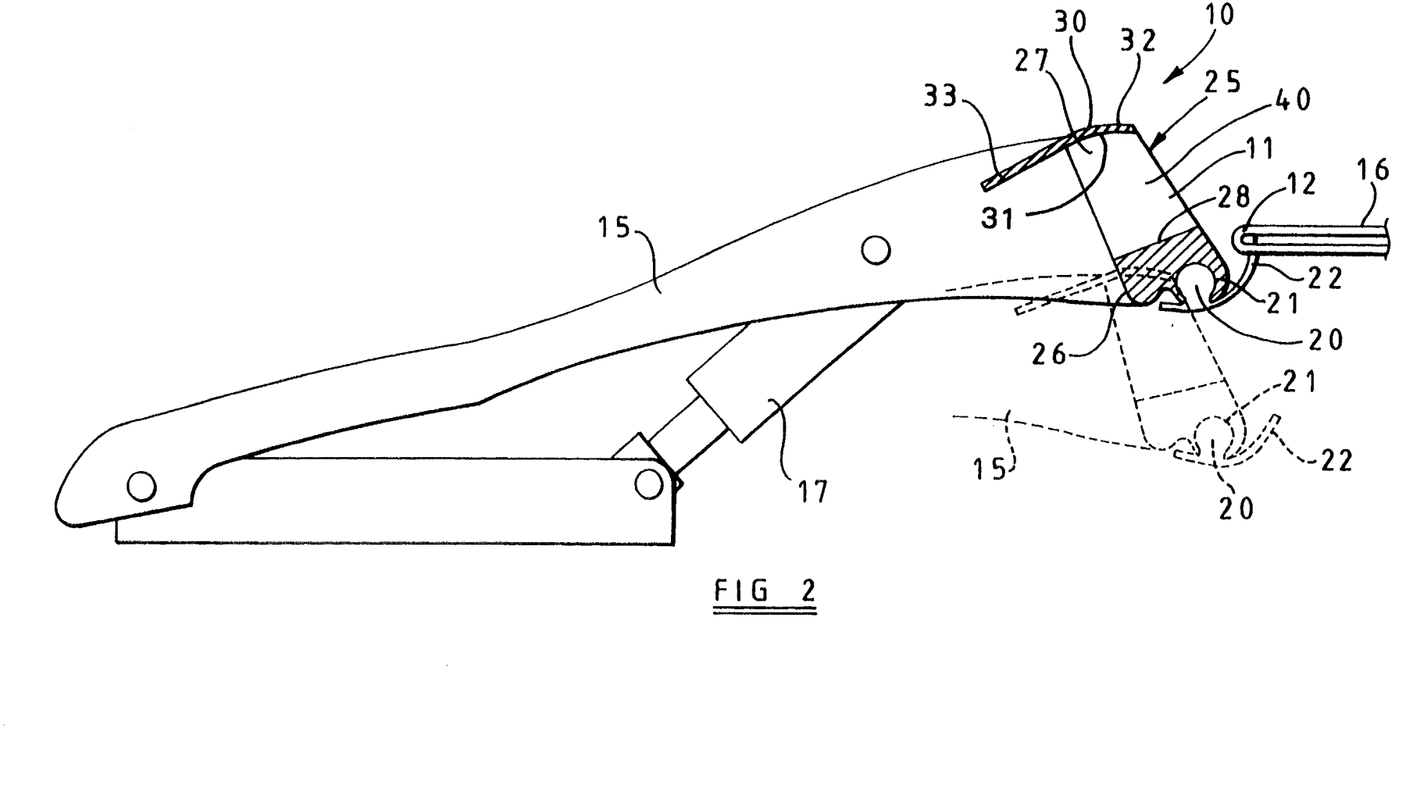
FIG. 2 is a sectional view of the wind deflector illustrated in FIG. 1.

As illustrated in FIGS. 1 and 2, the wind deflector 10 for the sunroof of a vehicle comprises an elongate body 11 which is located transversely of the vehicle adjacent leading edge 12 of the sunroof aperture 13.

The elongate body 11 is supported at opposite ends on arms 15 which are pivotally attached to the vehicle at a level below the level of the vehicle roof 16. Resilient struts 17 act between the vehicle and the arms 15 to bias the arms 15 upwardly. The arms 15 are arranged such that they will be engaged by the sunroof, as it is closed; so that when the sunroof is closed the wind deflector 10 will be depressed into a storage area provided below the sunroof as illustrated in broken line in FIG. 2; and when the sunroof is open, the wind deflector 10 will be deployed in an operational position in which the elongate body 11 extends above the roof level of the vehicle, as illustrated in full line in FIG. 2.

A sealing strip 20 is located in a longitudinal groove 21 along the lower edge of the elongate body 11, the sealing strip 20 having a lip formation 22 which sealingly engages the underside of the vehicle roof 16 when the wind deflector 10 is in its deployed position.

The elongate body 11 when deployed, presents a leading face 25 which is inclined rearwardly. The elongate body 11 is castellated providing alternate sections 26 and 27, each typically 50 mm wide, of differing heights. The upper surfaces 28 of the lower sections 26 are located at about roof level, when the wind deflector 10 is deployed, while the taller sections 27 extend upwardly above the roof level to a height of about 25 mm. A vane 30 is provided on the upper surfaces 31 of the taller sections 27 and extends the full length of the elongate body 11, bridging the lower sections 26. The vane 30 is 20 mm wide. The leading portion 32 of the vane 30 is substantially parallel to the roof 16 and the trailing portion 33 of the vane 30 is inclined downwardly to the roof line at an angle of 20 degrees, when the wind deflector 10 is in its deployed position. The upper surfaces 28 of the lower sections 26 are parallel to the trailing portion 33 of vane 30.

In operation, when the vehicle is in motion, the taller sections 27 of the wind deflector 10 will deflect the air flow away from the open sunroof aperture 13, in conventional manner. Air will however also flow through the apertures 40 defined between the lower sections 26 and the vane 30, the air flowing therethrough being deflected downwardly into the vehicle compartment, through the sunroof aperture 13. These downward currents of air will break up the shear layer between the air flow passing above the sunroof aperture 13 and the air within the vehicle compartment, reducing the booming noise produced by resonant interaction therebetween. Furthermore, the downward currents of air will provide controlled ventilation to the vehicle compartment.

Figure 3:
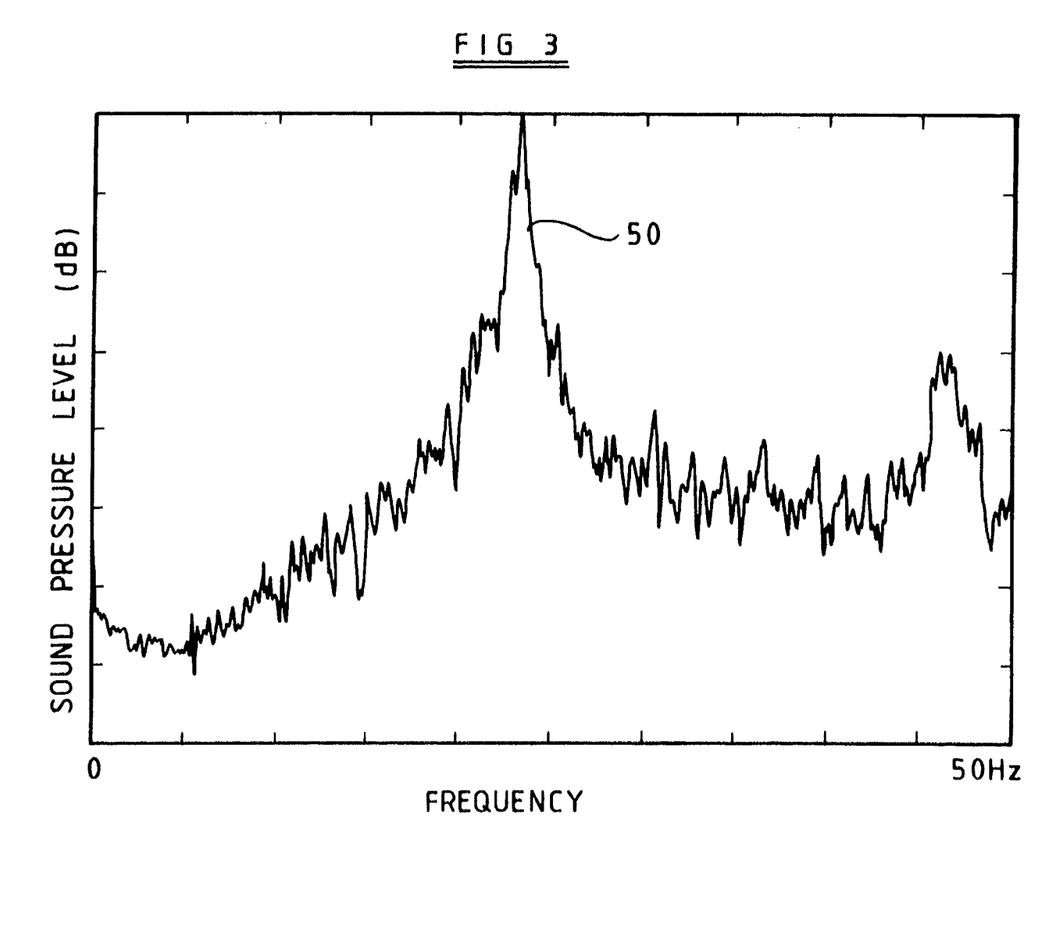
FIGS. 3 to 8 are plots of linear-weighted sound pressure levels against frequency for wind deflectors of varying configurations.

FIG. 3 is a plot of sound pressure against frequency for a conventional wind deflector with uniform cross section, operating with the sunroof fully open at a speed of 50 miles per hour. As will be seen, at 50 miles per hour in addition to the general broadband noise, a sound pressure level peak 50 occurs which represents the booming noise. This peak is effectively removed by reducing speed to 20 miles per hour or increasing speed to more than 70 miles per hour. At 90 miles per hour the boom peak is absent, but the broadband noise is of higher intensity than at 50 miles per hour.

Figure 4:
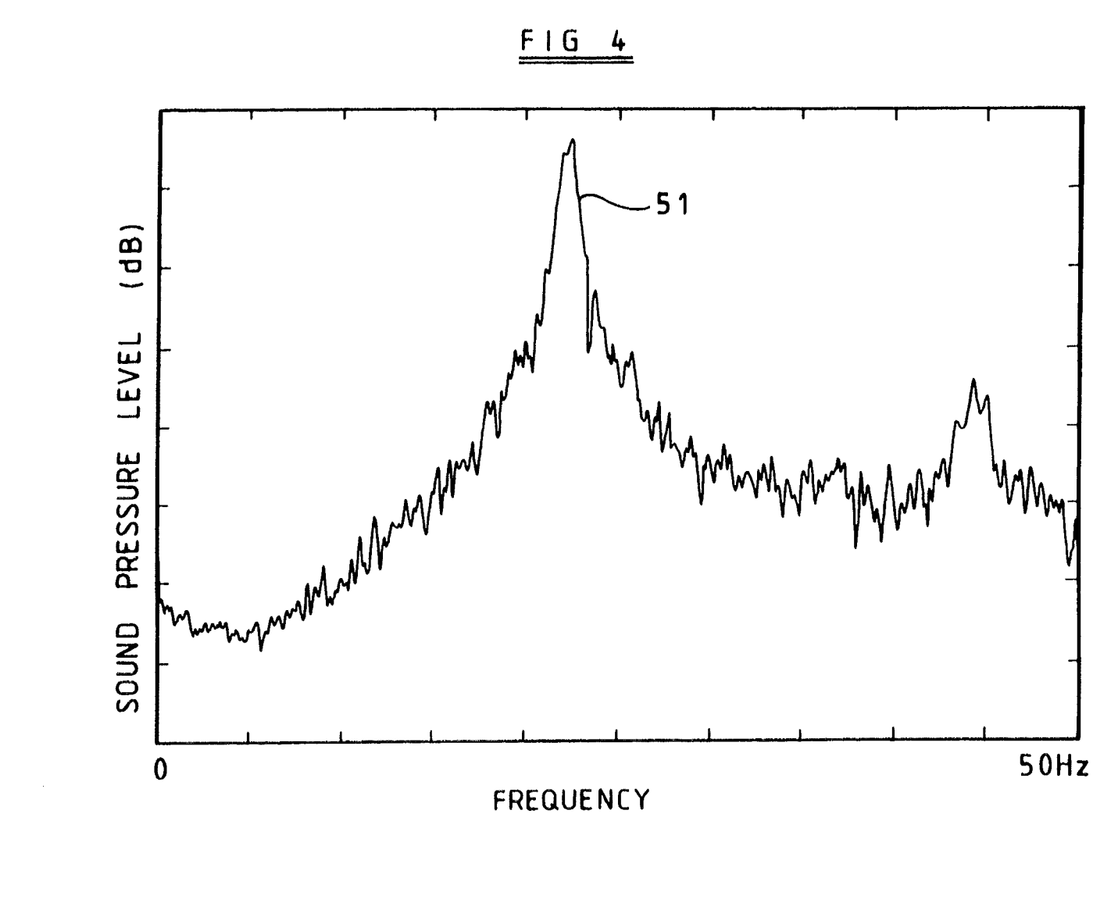

FIG. 4 is a plot similar to FIG. 3 for a wind deflector having 50 mm castellations but without the vane 30 of the present invention. In this case, the sound pressure level of the peak 51 is reduced by about 5 dB as compared with the peak 50 produced by the conventional wind deflector, but still being of significant magnitude.

Figure 5:
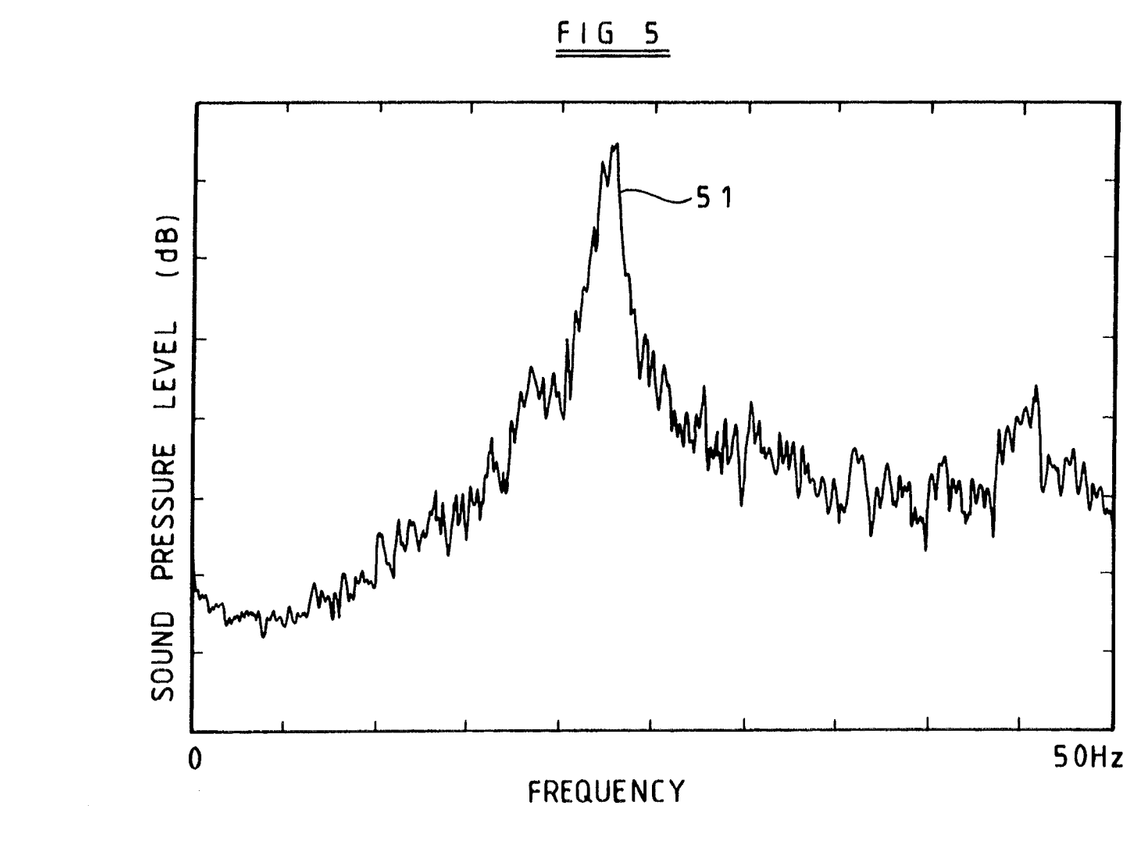

FIG. 5 is a plot similar to FIG. 3 for a wind deflector similar to that represented by FIG. 4 but with the upstanding edges of the castellations rounded to a radius of 8 mm. The plot again shows a reduction of about 3 or 4 dB in boom over the conventional wind deflector represented by FIG. 3.

Figure 6:
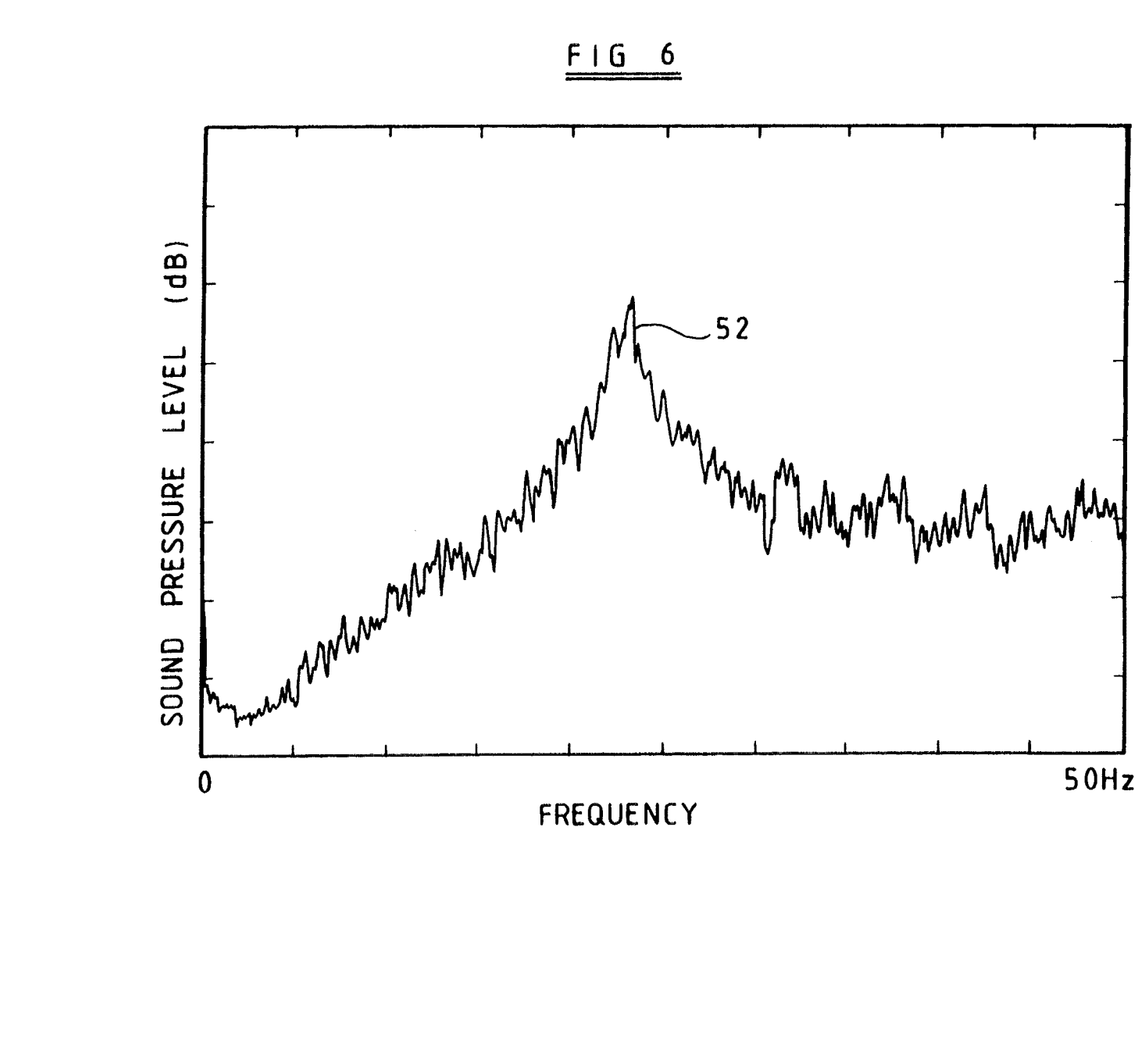
Figure 9:
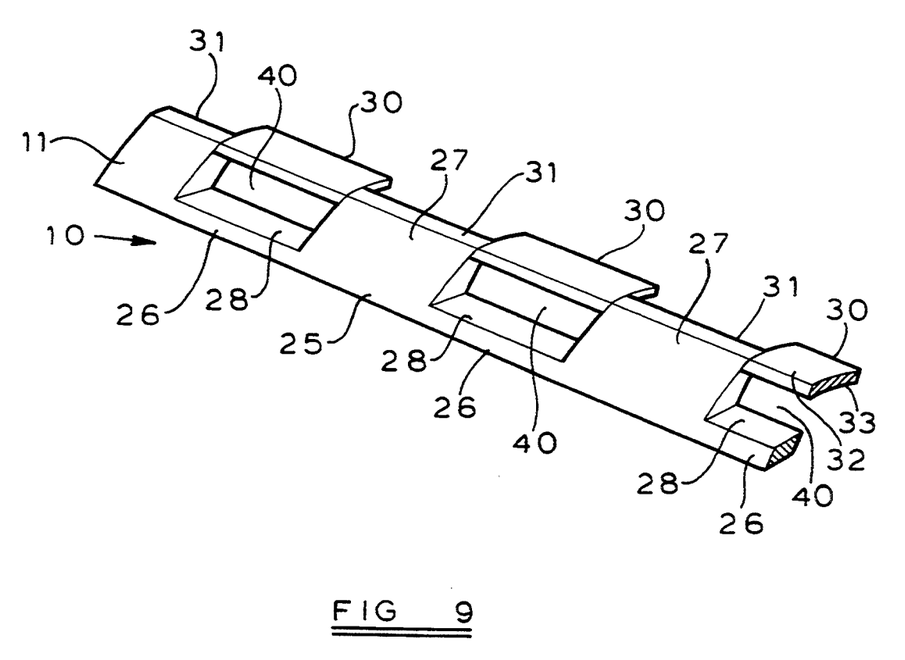
FIG. 9 illustrates in perspective view an alternative form of sunroof deflector in accordance with the present invention.

FIG. 6 is a plot similar to FIG. 3 for a wind deflector, as illustrated in FIG. 9, with a 10 mm vane 30 formed across the upper edges of the taller sections of the castellations, the trailing edge of the vane being inclined downwardly at 20° in accordance with the present invention. While this again shows the peak 52, the magnitude of this peak is significantly reduced, by of the order of 20 dB, as compared with the wind deflector represented by FIG. 3.

Figure 7:
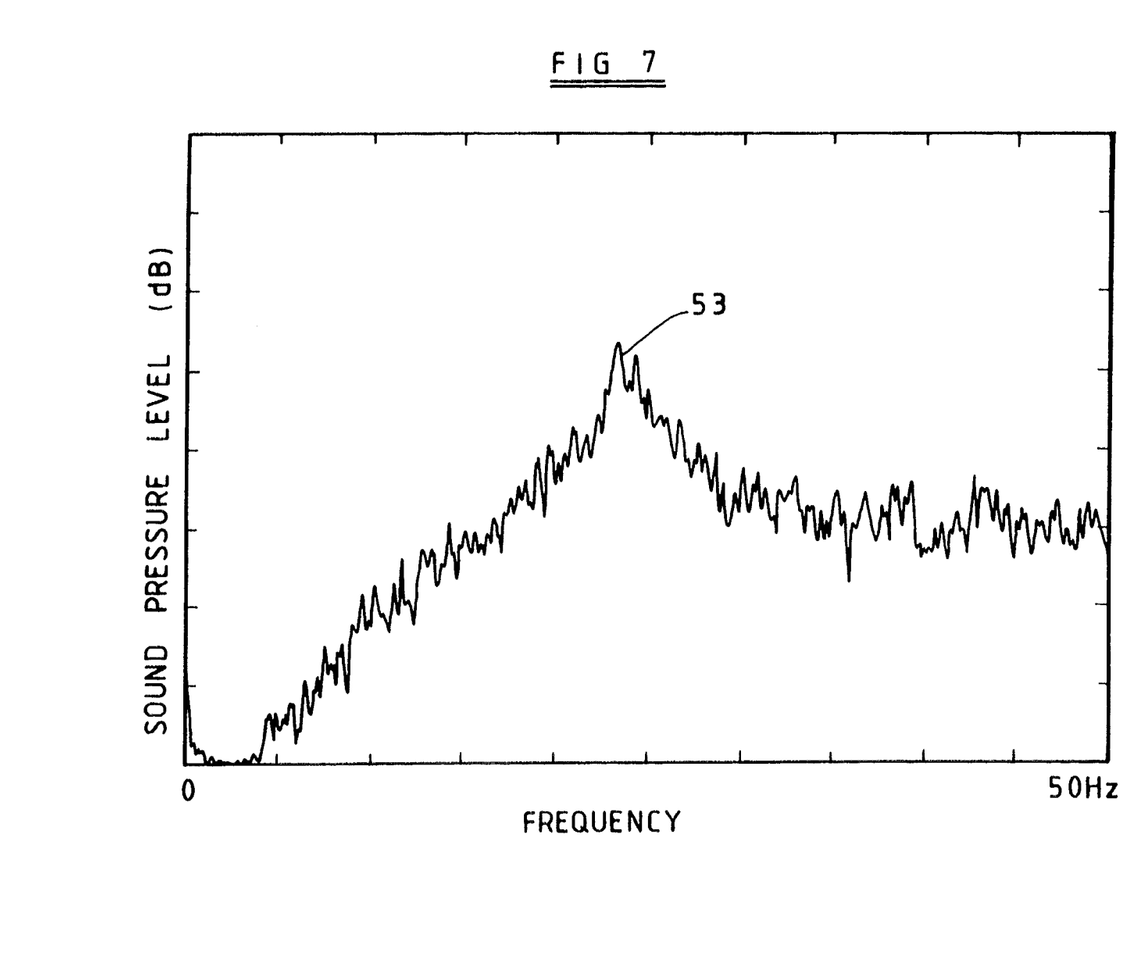

FIG. 7 is a plot similar to FIG. 3 for a wind deflector similar to that represented by FIG. 6 but with a 20 mm vane. As shown by this plot, there is a further reduction of the peak 53, by about 5 dB as compared with the wind deflector represented by FIG. 6.

Figure 8:
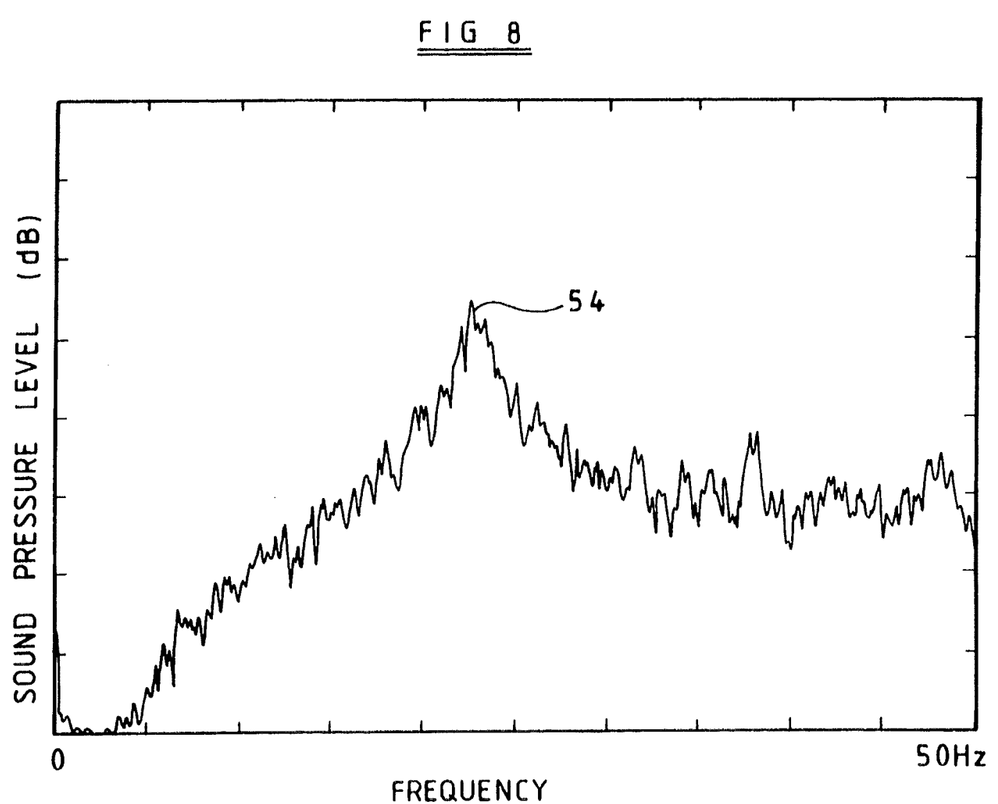

FIG. 8 is a plot similar to FIG. 3 for a wind deflector similar to that represented by FIG. 5 with a 20 mm vane formed across the upper surfaces of the castellations in accordance with the present invention. This plot again illustrates a similar reduction in sound level of the peak 54 to that of the wind deflector design represented by FIG. 7.

Various modifications may be made without departing from the invention. For example the dimensions of the wind deflector specified above are typical for conventional motor cars. For larger vehicles or for motor cars with large sunroofs, it may be necessary to scale up these dimensions. In other applications it may be necessary to provide sections of reduced height along only part of the elongate body.

We claim:

1. A wind deflector for the sunroof of a vehicle comprising an elongate body adapted to be located transversely of the vehicle along the leading edge of the sunroof aperture, the body extending above the level of the vehicle roof, the elongate body having alternate sections of different height relative to the level of the roof, vane formations extending between the upper edges of the taller sections, a trailing portion of the vane formations being inclined downwardly relative to a front portion of the vane formations and to the roof line to deflect air passing between the vane formations and the lower sections down through the sunroof aperture.

2. A wind deflector for the sunroof of a vehicle comprising an elongate body located transversely of a vehicle along a leading edge of a sunroof aperture, the body extending above the level of the vehicle roof, the elongate body having alternate sections of different height, vane formations extending between the upper edges of the taller sections, the vane formations being adapted to deflect air passing between the vane formations and the lower sections down through the sunroof aperture to break up a shear layer between air flow passing above the sunroof aperture and air within the vehicle compartment thereby reducing a booming noise produced by resonant interaction therebetween, and the vane formations continuing across the taller sections to form a continuous vane formation running the full length of the elongate body.

3. A wind deflector according to claim 1 in which the leading edge of the vane is substantially parallel to the roof line.

4. A wind deflector according to claim 3 in which the leading edge of the vane formation is inclined at ±5 degrees to the roof line.

5. A wind deflector according to claim 1 in which the trailing edge of the vane formation is inclined downwardly at an angle of from 10 to 30 degrees to the roof line.

6. A wind deflector according to claim 1 in which the vane formation is between 10 and 30 mm wide.

7. A wind deflector according to claim 1 in which the upper surfaces of the lower sections are substantially parallel to the trailing edge of the vane formations.

8. A wind deflector according to claim 1 in which the alternating taller and lower sections of the elongate body are substantially equally spaced.

9. A wind deflector according to claim 1 in which the alternating taller and lower sections of the elongate body are of similar width.

10. A wind deflector according to claim 1 in which the taller and lower sections of the elongate body are from 25 mm to 75 mm wide.

11. A wind deflector according to claim 1 in which the upper edge of each lower section is located at or below the level of the roof, the taller sections extending beyond the roof level so that the vane formations are disposed above the roof level.

12. A wind deflector according to claim 11 in which the vane formation is disposed at least 15 mm above the roof level.

13. A wind deflector according to claim 11 in which the vane formation is disposed at a height of between 15 mm and 30 mm above the roof level.

14. A wind deflector according to claim 1 in which the elongate body is mounted for movement between a deployed position in which it extends above the level of the roof when the sunroof is open and a retracted position in which it is located beneath the sunroof when closed.

15. A wind deflector according to claim 1 in which the elongate body is provided with sealing means, said sealing means extending along the length of the elongate body, the sealing means engaging the leading edge of the sun roof aperture when the wind deflector is deployed, to provide a seal between the wind deflector and the leading edge of the sun roof aperture.

* * * * *